US008254766B2

(12) United States Patent
Qiu et al.

(10) Patent No.: US 8,254,766 B2
(45) Date of Patent: Aug. 28, 2012

(54) METHOD AND APPARATUS FOR MEDIA PLAYBACK

(75) Inventors: Junhai Qiu, Beaverton, OR (US); Ajit Joshi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1141 days.

(21) Appl. No.: 11/904,388

(22) Filed: Sep. 27, 2007

(65) Prior Publication Data

US 2009/0087162 A1    Apr. 2, 2009

(51) Int. Cl.
*H04N 5/783* (2006.01)
*H04N 5/935* (2006.01)
*H04N 5/931* (2006.01)
*H04N 5/932* (2006.01)

(52) U.S. Cl. ........ 386/345; 386/205; 386/206; 386/211; 386/214; 386/220; 386/217; 386/343; 386/344; 386/346; 386/347; 386/348; 386/349; 386/350; 386/351

(58) Field of Classification Search .................. 386/205, 386/206, 211, 214, 220, 217, 343, 344, 345, 386/346, 347, 348, 349, 350, 351
See application file for complete search history.

(56) References Cited

U.S. PATENT DOCUMENTS

| 6,434,321 | B1* | 8/2002 | Eshima | 386/343 |
| 2004/0179825 | A1* | 9/2004 | Im | 386/111 |
| 2005/0138663 | A1 | 6/2005 | Throckmorton et al. | 725/80 |
| 2006/0146040 | A1* | 7/2006 | Shen | 345/204 |
| 2007/0157267 | A1 | 7/2007 | Lopez-Estrada | 725/90 |
| 2008/0019445 | A1* | 1/2008 | Aono et al. | 375/240.12 |

FOREIGN PATENT DOCUMENTS

WO   WO 2006030694   *  3/2006
WO   WO 2006114762 A2 * 11/2006
* cited by examiner

*Primary Examiner* — Daquan Zhao
(74) *Attorney, Agent, or Firm* — Trop, Pruner & Hu, P.C.

(57) ABSTRACT

In one embodiment of the invention, a memory may receive digital video data containing a first I frame and a second I frame with a plurality of P frames located between the I frames. The I frames each include a first timestamp. A processor may determine a subset of the P frames to be played in a trick mode along with the first I frame and the second I frame based on the number of P frames included in the plurality of P frames and the desired playback speed.

17 Claims, 3 Drawing Sheets

METHOD AND APPARATUS FOR MEDIA PLAYBACK

BACKGROUND

Movies found on digital video discs (DVD) are but one example of how digital media has become very popular in homes, automobiles, and the like. There are entire standards groups, such as Moving Picture Experts Group (MPEG), that determine audio and video coding standards (e.g., MPEG2) to regulate various forms of digital media. Despite the ubiquitous nature of digital media and content, manipulating items like MPEG files (e.g., DVDs) and other forms of digital data can be cumbersome. For example, in addition to normal playback operations such as Play, Pause and Stop, media content may be manipulated using a "trick mode" or "trick play." Trick mode allows a user to manipulate content with actions such as fast forward, fast reverse, time seek, jumping to a scene in a movie, and so forth. However, advancing (e.g., "fast forwarding") data, reversing (e.g., "fast backward") data, or performing similar manipulations can result in a jerking and inconsistent playback that can be frustrating for the user.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

Figure 1:
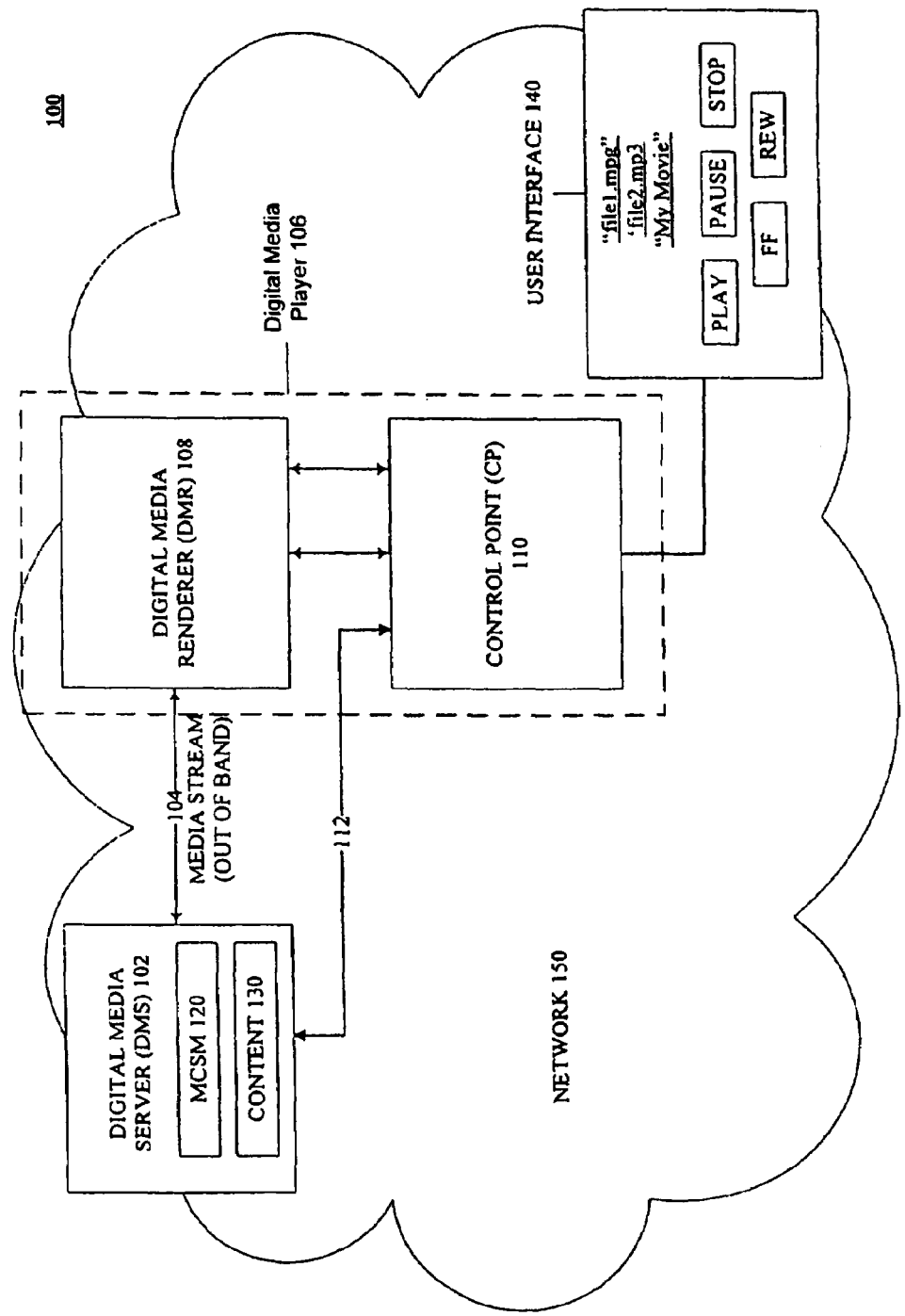
FIG. 1 is a block diagram of a system in accordance with an embodiment of the present invention.

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

As stated above, the trick mode (e.g., forward scan, backward scan) process occurs during media content playback. The trick mode process may involve selecting samples or frames and modifying the time stamp of samples/frames so media content can be played back quickly or slowly, in the forward or reverse mode. More specifically, digital media content is compressed and may contain various frames of media content. A Group of Pictures (GOP) may mark the beginning of a series of encoded frames that do not have any dependencies on previous frames. Thus, the start of a GOP may be used for random access into a media stream. The GOP may have various frame types, such as an Index (I) frame, followed by predictive (P) frames and bi-directional predictive (B) frames. The GOP may comprise one portion of a MPEG-2 system stream.

An I-frame may be a compressed version of a single uncompressed (raw) frame. Unlike P-frames and B-frames, I-frames do not depend on data in the preceding or the following frames. In one embodiment of the invention, every Xth frame (e.g., $15^{th}$ frame) in a media stream is an I-frame. P-frames and B-frames might follow an I-frame like this, IBBPBBPBBPBB(I), to form the GOP. P-frames provide more compression than I-frames because they take advantage of the data in the previous I-frame or P-frame. To generate a P-frame, the previous reference frame may be reconstructed. The frame being compressed may be divided into macroblocks. Then, for each macroblock the reconstructed reference frame may be searched to find the macroblock that best matches the macroblock being compressed. The offset may then be encoded as a "motion vector." The processing of B-frames is similar to that of P-frames except that B-frames may use the picture in the following reference frame as well as the picture in the preceding reference frame. As a result, B-frames may provide more compression than P-frames.

Due to their reliance on previous frames or samples, P or B samples cannot be decoded without having their reference samples available. As such, there are several traditional methods for handling trick mode in digital media. For example, a hardware device or software application may utilize only I samples in trick mode playback (e.g., fast forward) due to resource constraints (e.g., processor, memory) and ease of implementation. However, the interval between two successive I samples could be very big so playback may not be smooth. As another example, other devices may decode all samples and modify time stamps to instruct the rendering device (e.g., receiver) to play samples back faster. However, if all samples are decoded the device may not be able to playback samples at the specified speed.

Instead, in one embodiment of the invention P samples may be used to fill the gap between two successive I samples when entering trick mode. The number of P samples used to fill the gap between I samples may be determined by the (i) playback speed and the (ii) available number of P samples in the aforementioned gap. In one embodiment of the invention, as playback speed increases fewer P samples may be used to fill the gap. The time stamps of these selected P samples may be intentionally modified so that playback of these samples will maintain their original pace. As a result, resource usage (e.g., processor, memory, and network bandwidth) is not increased because the number of samples to be handled per second remains unchanged. Thus, users may enjoy increased playback speed while still observing more details of the content along with a smoother playback of the content.

Figure 2:
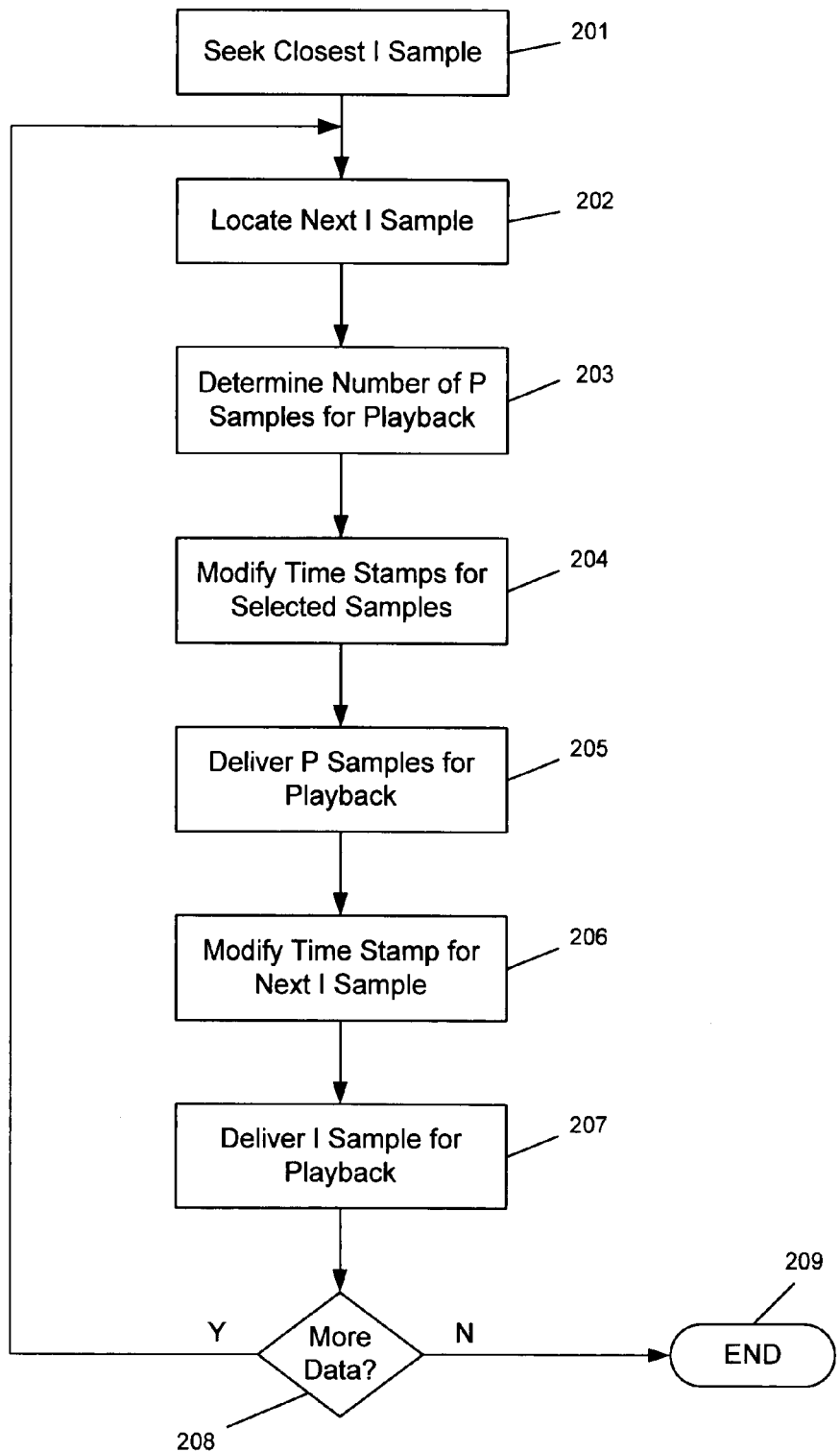
FIG. 2 is a flow diagram of a method in accordance with one embodiment of the present invention.
Figure 3:
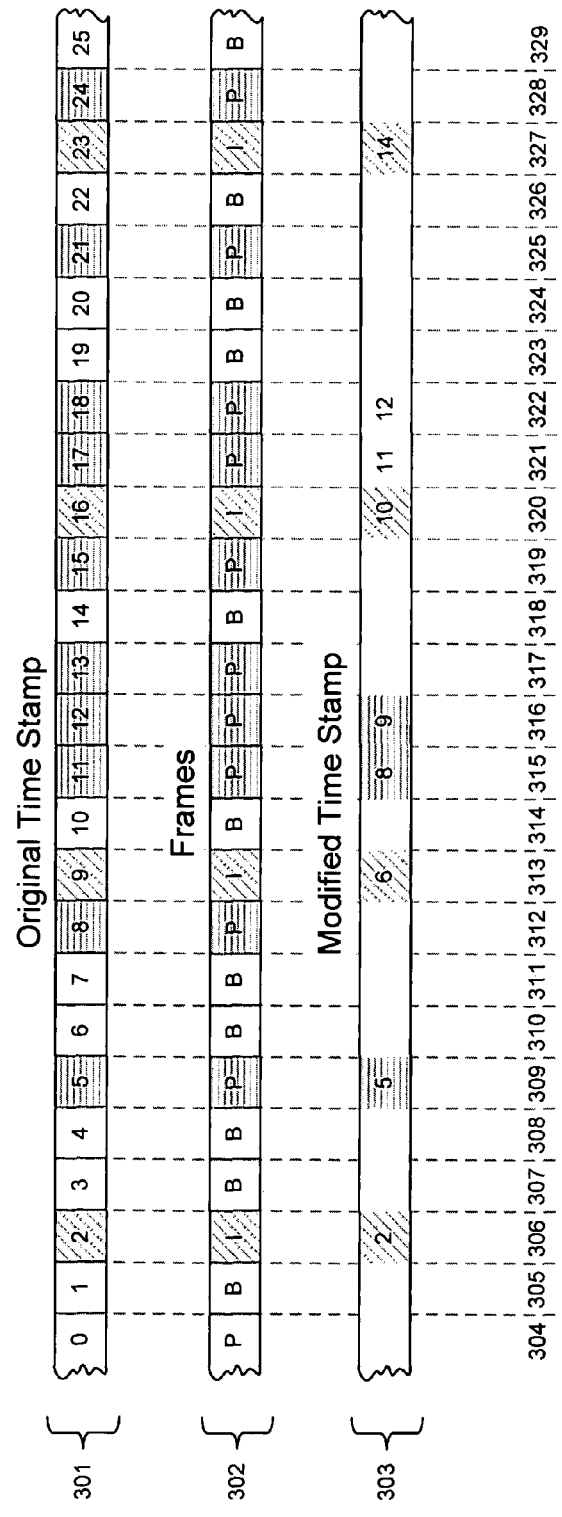
FIG. 3 is a block diagram of data in accordance with an embodiment of the present invention.

FIG. 2 is a flow diagram of a method in accordance with one embodiment of the present invention. FIG. 3 is a block diagram of data 302 in accordance with an embodiment of the present invention. For example, the first frame or sample illustrated is a P frame in column 304. The column is used simply to facilitate description of the data stream. The frame is a B frame in column 305, followed by an I frame in column 306, and so on. In one embodiment of the invention, there is an original time stamp 301 for every frame 302. For the P frame in column 304, the associated time stamp is 0. For the B frame in column 305, the original time stamp is 1. For the I frame in column 320, the original time stamp is 16.

In one embodiment of the invention, however, not all frames/samples will be seen in trick mode. To that end, the following formulas and method (e.g., FIG. 2), and variations of those formulas and method, may be used. In block 201, the closest I sample is sought when entering trick mode. For example, the I frame in column 306 may be sought and selected. The original time stamp for this I frame is 2. A modified time stamp may also be composed for the I frame. At this stage of the method, this "modified" time stamp is set equal to the original time stamp as follows: (Ti-last-m)=(Ti-last-o), where Ti-last-o are is the original (o) time stamp and Ti-last-m is the modified (m) time stamp both related to the last I sample delivered. Thus, the modified time stamp in row 303 of FIG. 3 is set to 2. This frame is then delivered for playback in trick mode.

In block 202, the next I sample is searched. For example, the I frame in column 313 may be searched for and selected. In block 203 the number of P samples that are between the two I frames and which can be utilized for playback in trick mode are determined based on, for example only, the playback speed and the number of total P frames between the I frames in question. Accordingly, (Pselected)=(Pbetween/Stm), where Pselected is number of P samples selected for playback in trick mode, Pbetween is number of samples between the last I sample and the next I sample, and Stm is the speed of trick mode (e.g., 2 for two times faster, 4 for four times faster). For example, there are two P frames (309, 312) between the I frames in question (306, 313). With a playback speed of 2×, Pselected=2/2=1. With one P frame available for playback, the first P frame 309 is chosen and the second P frame 312 is not chosen. This selection may occur in one embodiment of the invention because the second P frame 312 might rely upon an unselected frame 309 that precedes it, which may cause an error. In contrast, if P frame 309 is selected there may be no error because the P frame relies on I frame 306.

In block 204 the chosen P frame 309 receives a modified time stamp to maintain its original presentation period and deliver the chose sample or frame for playback in trick mode. In one embodiment of the invention, (Tp-m)=(Tp-o)−(Ti-last-o)+(Ti-last-m); where Tp-m is the modified (m) time stamp for the selected frame (e.g., 5 for P frame 309), Tp-o is original (o) time stamp for the selected frame (e.g., 5 for P frame 309). In other words, addressing P frame 309, (Tp-m)=(5)−(2)+(2)=5. As the playback progresses (see below), the modified time stamps will differ from the original time stamps. In block 205, the chosen P sample 309 is delivered for playback.

In block 206, the time stamp for the next I sample is modified based on playback speed as follows: Ti-next-m=(Ti-next-o−Ti-last-o)/(Stm)+(Ti-last-m); where Ti-next-m is the modified (m) time stamp for the next I frame (e.g., 313) and Ti-next-o is the original time stamp (o) of the next I sample (e.g., 313). For example, Ti-next-m=(9−2)/(2)+(2)=5.5 which may be rounded to 6. In block 207, the I sample 313 is delivered for playback.

In block 208, if there is no more data for playback the method ends in block 209. However, if there is more data the method repeats as follows: (Ti-last-o)=(Ti-next-o) and (Ti-last-m)=(Ti-next-m). Thus, (Ti-last-o)=9 and (Ti-last-m)=6. Blocks 202-208 then repeat.

FIG. 1 is a block diagram of a media processing system 100 in accordance with an embodiment of the present invention. In one embodiment, for example, media processing system 100 may comprise multiple nodes. A node may comprise any physical or logical entity for processing and/or communicating information in media processing system 100 and may be implemented as hardware, software, or any combination thereof, as desired for a given set of design parameters or performance constraints. Although FIG. 1 is shown with a limited number of nodes in a certain topology, it may be appreciated that media processing system 100 may include more or less nodes in any type of topology as desired for a given implementation. The embodiments are not limited in this context.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), television, a digital television, a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a processor, and so forth. The embodiments are not limited in this context. Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

In various embodiments, media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standard, the Advanced Television Systems Committee (ATSC) standard, the Phase Alteration by Line (PAL) standard, the MPEG-1 standard, the MPEG-2 standard, the MPEG-4 standard, the Digital Video Broadcasting Terrestrial (DVB-T) broadcasting standard, the DVB Satellite (DVB-S) broadcasting standard, the DVB Cable (DVB-C) broadcasting standard, the Open Cable standard, the Society of Motion Picture and Television Engineers (SMPTE) Video-Codec (VC-1) standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, and so forth. The embodiments are not limited in this context.

In various embodiments, the nodes of media processing system 100 may be arranged to communicate, manage or process different types of information, such as media information and control information. Examples of media information may generally include any data or signals representing content meant for a user, such as media content, voice information, video information, audio information, image information, textual information, numerical information, alphanumeric symbols, graphics, and so forth. Control information may refer to any data or signals representing commands, instructions or control words meant for an automated system. For example, control information may be used to route media information through a system, to establish a connection between devices, instruct a node to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, media processing system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, media processing system 100 may include one or more wireless nodes arranged to communicate information over one or more types of wireless communication media. An example of wireless communication media may include portions of a wireless spectrum, such as the RF spectrum. The wireless nodes may include components and interfaces suitable for communicating information signals over the designated wireless spectrum, such as one or more antennas, wireless transmitters/receivers ("transceivers"), amplifiers, filters, control logic, antennas, and so forth. The embodiments are not limited in this context.

In various embodiments, media processing system 100 may include one or more media source nodes. Media source nodes may comprise any media source capable of sourcing or delivering media information and/or control information to media processing node 106. More particularly, media source nodes may comprise any media source capable of sourcing or delivering digital audio and/or video (AV) signals to media processing node 106. Examples of media source nodes may include any hardware or software element capable of storing and/or delivering media information, such as a DVD device, a VHS device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, digital audio devices (e.g., MP3 players), and so forth. Other examples of media source nodes may include media distribution systems to provide broadcast or streaming analog or digital AV signals to media processing node 106. Examples of media distribution systems may include, for example, Over The Air (OTA) broadcast systems, terrestrial cable systems (CATV), satellite broadcast systems, and so forth. It is worthy to note that media source nodes 102-1-$n$ may be internal or external to media processing node 106, depending upon a given implementation. The embodiments are not limited in this context.

In various embodiments, media processing system 100 may comprise a media processing node 106 to connect to media source nodes over one or more communications media 104. Media processing node 106 may comprise any node as previously described that is arranged to process media information received from media source nodes 102. In various embodiments, media processing node 106 may comprise, or be implemented as, one or more media processing devices having a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing architecture. The embodiments are not limited in this context.

In one embodiment, for example, media processing system 100 may be implemented as part of a digital home architecture using the DLNA and/or UPnP standards. When implemented in accordance with the DLNA standard, for example, media source node 102 may be implemented as a digital media server (DMS), and media processing node 106 may be implemented as a digital media player (DMP). When implemented in accordance with the UPNP standard, for example, DMP 106 may be further separated to include a digital media renderer (DMR) 108 and a control point (CP) 110. DMS 102 and DMP 106 may communicate media and control information over communication media 104 (e.g., wired or wireless). DMS 102 and CP 110 may communicate media and control information over communication media 112 (e.g., wired or wireless). The embodiments are not limited in this context.

In accordance with the UPnP standard, DMS 102 may operate as the source of media content 130 and DMP 106 may operate as the sink that consumes media content 130. CP 110 may be arranged to discover devices in the network, negotiate formats between DMS 102 and DMP 106, and establish a connection between the devices. CP 110 may additionally include a user interface 140. User interface 140 may allow a user to perform various standard control mode operations and trick mode operations for media content 130. Examples of standard control mode operations may include Play, Stop and Pause operations. Examples of trick mode operations may include Fast Forward (FF), Rewind (REW), fast reverse, time seek, jumping to a scene in a movie, and so forth. Discovery and negotiation operations may be performed using UPnP specified protocols, such as the IETF Simple Service Discovery Protocol (SSDP) and the Extensible Markup Language (XML) Protocol Working Group Simple Object Access Protocol (SOAP). Once a connection is established, media content 130 may be streamed directly from DMS 102 to DMP 106 over media 104 using various out-of-band non-UPnP specific protocols, such as HTTP, for example. After the connection is established, CP 110 may perform various transport control operations, such as standard control mode operations (e.g., Play, Pause and Stop) and trick mode operations (e.g., FF and REW). CP 110 may perform such transport control operations in accordance with standard defined SOAP actions. Device capabilities (e.g., formats for each device), however, is generally outside the scope of the UPnP standard. Accordingly, the DLNA standard may be used to improve interoperability between the various media devices of media processing system 100.

In one embodiment, for example, DMS 102 may include a media content seek module (MCSM) 120. MCSM 120 may be arranged to perform video sequence header alignment for media content in response to a time seek request. MCSM 120 may perform group of picture header alignment if the time seek request includes a time value that is within a first video sequence. MCSM 120 may perform the video sequence header alignment if the time seek request includes a time value that is within a second video sequence. MCSM 120 may perform the video sequence header alignment if the time value is less than a predefined number of time units (e.g., seconds) of a video sequence header. If the time value is more than a predefined number of time units of a video sequence header, MCSM 120 may perform video sequence header retransmission.

In accordance with the DLNA standard, media processing system 100 may define baseline device capabilities for DMS 102 and DMP 106 to improve interoperability between such devices. The DLNA standard may define various types of devices, including DMS 102 and DMP 106. In UPNP terms, DMP 106 may be further defined to comprise CP 110 coupled to DMR 108. The communication between DMR 108 and CP 110 is therefore not defined by the DLNA standard since these elements may be implemented in a single device, hardware component, software component, or combination of hardware/software components. The embodiments may encompass such future enhancements to the DLNA standard.

In general operation, DMS 102 may communicate or stream media content such as A/V content to DMP 106 over media transport 104. DMS 102 may include a stream encoder that receives digital "raw" audio and video at the encoding pipeline, compresses the A/V data, forms the compressed A/V data into packets, and multiplexes the A/V into a single bitstream useful for transmission over communications medium 104. Similarly, DMP 106 may receive the encoded stream, demultiplex the encoded A/V signals, depacketize the A/V compressed data, and decompress the compressed A/V data into the original A/V content.

In one embodiment, for example, the media content may be encoded and decoded in accordance with the MPEG-2 standard. The MPEG-2 standard defines two types of system streams, to include Program Streams (PS) and Transport Streams (TS). The PS format may be used for more reliable environments such as storing/retrieving from local media. This is a format that may be used by a DVD device. The TS format may be used for more error prone environments by providing increased metadata redundancy for error recovery and smaller packets. This format may be used for satellite and terrestrial broadcast (e.g., ATSC).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
obtaining digital video data containing a first intra-coded frame (I frame) and a second I frame with a first plurality of predictive-coded frames (P frame) and no additional I frame located between the first I frame and the second I frame; wherein the first I frame and the second I frame respectively correspond to original timestamps;
determining a subset of the first plurality of P frames to be played in a trick mode along with the first I frame and the second I frame based on the number of P frames included in the plurality of P frames; wherein each P frame in the subset respectively corresponds to an original timestamp;
determining additional timestamps respectively for the first I frame, the second I frame, and each P frame in the subset; and
playing in the trick mode the first I frame, the second I frame, and each P frame in the subset based on the respective additional timestamp for each of the first I frame, the second I frame, and each P frame in the subset.

2. The method of claim 1, further comprising playing in the trick mode the first I frame, the second I frame, and each P frame in the subset based on the play speed of the trick mode; wherein the trick mode includes a play speed that is faster than a normal play speed associated with a non-trick mode.

3. The method of claim 2, further comprising playing in the trick mode the first I frame, the second I frame, and each P frame in the subset based on a ratio between the play speed of the trick mode and the number of P frames included in the plurality of P frames.

4. The method of claim 3, further comprising playing the first I frame, the second I frame, and each P frame in the trick mode at a first frequency of frames per second; wherein the normal play speed also plays frames at the first frequency of frames per second.

5. The method of claim 3, further comprising playing in the trick mode a P frame of the subset for the duration of a first time period, wherein the normal play speed is also to play the P frame of the subset for the duration of the first time period.

6. The method of claim 5, wherein the trick mode include playing faster than the normal play speed.

7. The method of claim 1, further comprising determining the subset of the first plurality of P frames to include a first P frame but not a second P frame, wherein the first P frame precedes the second P frame.

8. The method of claim 7, further comprising determining the subset of the first plurality of P frames to exclude all bidirectionally predictive-coded frames (B frame); wherein the digital video data includes at least one B frame located between the first I frame and the second I frame.

9. The method of claim 1, wherein the subset includes fewer P frames than the first plurality of P frames.

10. The method of claim 1, wherein (a) the first plurality of P frames includes first, second, and third P frames, (b) the subset includes the first and second P frames but not the third P frame, and (c) playing in the trick mode each P frame in the subset includes playing in the trick mode the first and second P frames but not the third P frame.

11. An apparatus comprising:
a memory to receive digital video data containing a first intra-coded frame (I frame) and a second I frame with a first plurality of predictive-coded frames (P frame) and no additional I frame located between the first I frame and the second I frame; wherein the first I frame and the second I frame are to respectively correspond to original timestamps; and a processor, coupled to the memory, to:
determine a subset of the first plurality of P frames to be played in a trick mode along with the first I frame and the second I frame based on the number of P frames included in the plurality of P frames; wherein each P frame in the subset is to respectively correspond to an original timestamp and the subset includes fewer P frames than the first plurality of P frames;
determine an additional timestamp respectively for each P frame in the subset; and
play in the trick mode the first I frame, the second I frame, and each P frame in the subset based on the respective additional timestamp for each P frame in the subset.

12. The apparatus of claim 11, wherein the processor is to play in the trick mode the first I frame, the second I frame, and each P frame in the subset based on the play speed of the trick mode; wherein the trick mode is to include a play speed that is faster than a normal play speed associated with a non-trick mode.

13. The apparatus of claim 12, wherein the processor is to play in the trick mode the first I frame, the second I frame, and each P frame in the subset based on a ratio between the play speed of the trick mode and the number of P frames included in the plurality of P frames.

14. The apparatus of claim 13, wherein the processor is to play the first I frame, the second I frame, and each P frame in the trick mode at a first frequency of frames per second; wherein the normal play speed is to also play frames at the first frequency of frames per second.

15. The apparatus of claim 13, wherein the processor is to play in the trick mode a P frame of the subset for the duration of a first time period, wherein the normal play speed is also to play the P frame of the subset for the duration of the first time period.

16. The apparatus of claim 11, wherein the processor is to determine the subset of the first plurality of P frames to include a first P frame but not a second P frame, wherein the first P frame is to precede the second P frame.

17. The apparatus of claim 16, wherein the processor is to determine the subset of the first plurality of P frames to exclude all bidirectionally predictive-coded frames (B frame); wherein the digital video data is to include at least one B frame located between the first I frame and the second I frame.

* * * * *